Oct. 14, 1947.　　A. K. PETERSON　　2,428,891
CONTOUR GRINDER
Filed June 2, 1945
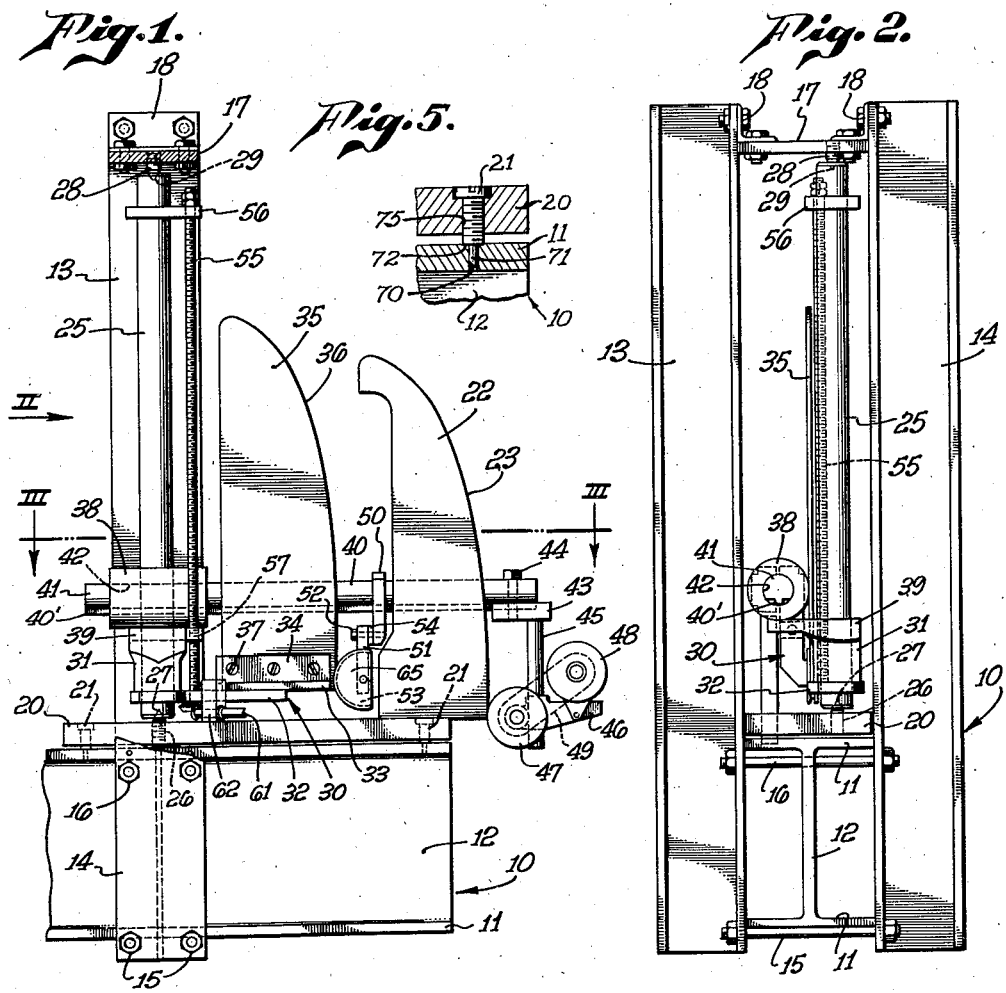
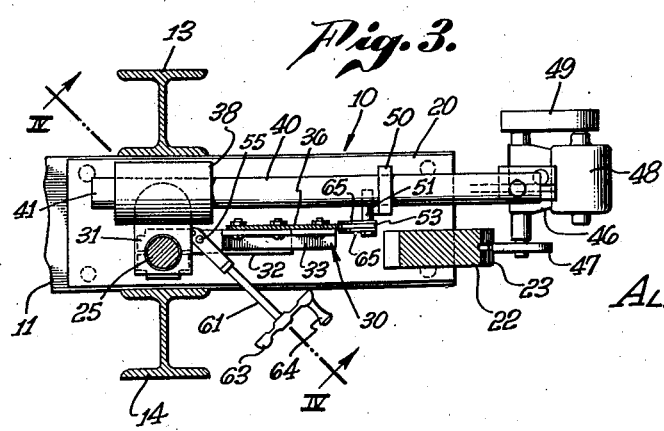
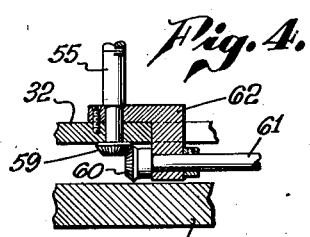
ALBIN K. PETERSON,
INVENTOR.
BY
ATTORNEY.

Patented Oct. 14, 1947

2,428,891

UNITED STATES PATENT OFFICE 2,428,891

CONTOUR GRINDER

Albin K. Peterson, Torrance, Calif., assignor to Longren Aircraft Company, Torrance, Calif., a corporation of California Application June 2, 1945, Serial No. 597,359

14 Claims. (Cl. 51—100)

My invention relates to machine tools and particularly to a shaping tool such as a grinder which is adapted to shape a compound curved surface on a piece of material.

In the construction of a wide variety of articles and particularly aircraft, there has been a great necessity to streamline the exterior parts. When a part is streamlined, the surface is made to conform as nearly as possible to the direction of the flow of air past the part. Experiments have shown that the path of air follows a certain line of curvature over the surface of a body which may be passed through it and that this curvature is irregular in the sense that it does not on all occasions follow a simple geometric pattern.

Streamlined curves are usually elongated arcs wherein the radius of curvature may be rather short at one end and considerably longer at the other. If the particular object necessitating streamlining chances to be initially cylindrical in form, such as the cowling of a motor, the shape of the streamlined exterior in cross section may be circular, but cross sections taken at progressively different points throughout the length of the object will show a marked difference in the radius of curvature. Correctly calculated streamlining is important to reduce wind resistance, increase speed and conserve fuel consumption. As aircraft, for example, are designed for higher and higher speeds, it becomes increasingly more important that the shape of the streamlined surfaces be made exactly according to calculations.

Furthermore, as the contour of the streamlined surface becomes well established and adapted for use on a great number of planes, it becomes advisable to have a machine tool which, by a simple and efficient procedure, is capable of duplicating a streamlined design with a high degree of accuracy.

Further, because of the fact that so many of these parts are of relatively large dimensions, a special tool need be employed so that large sections can be formed with a single setup of the tool and be so further designed as to minimize the number of man hours required to operate the machine while completing the shaping of a single streamlined work piece.

With these aims in view, therefore, it is an object of my invention to provide a new and improved machine tool adapted to form a double curvature upon a work piece which will be versatile in character so as to be useful in shaping work pieces to a variety of different curvatures without changing the essential setup of the machine tool. The work piece may be a die or form for use in a press or forming machine, such as a stretch press for use in manufacturing finished articles or pieces, or it may be the ultimate finished piece itself.

Another object of my invention is to provide a new and improved machine tool which, by the use of a variety of templates, can be made to form a work piece into a wide variety of different types of curves, both concave and convex.

Still another object of my invention is to provide a contour shaper which is capable of use on large sections so that the entire section can be machined during one operation.

A further object of my invention is to provide a contour shaper which may be a grinder so designed that the shaper is adapted to form a finished surface curved in two directions while following a template which is curved in only one direction.

A still further object of my device is to provide a contour grinder or shaper for finishing a work piece with a compound curved surface which is simple and rugged in its construction and designed so that it may be operated by relatively inexperienced help and which, when once set up, is capable of producing one or more parts in the nature of forms with a high degree of accuracy so that they can be used in turn to make other parts in large quantities.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of my device showing a template and work piece in position.

Fig. 2 is a rear view of the device shown in Fig. 1 taken in the direction of the arrow II.

Fig. 3 is a cross-sectional view taken on the line III—III of Fig. 2.

Fig. 4 is a fragmentary elevational view on the line IV—IV of Fig. 3.

Fig. 5 is an enlarged fragmentary view in section of a detailed embodiment of the invention.

Constant research in the development of proper shape for fuselage, wings and other parts of aircraft has made necessary the preparation of machine tools which can reproduce intricate designs so that the material embodied in the fuselage or wing will precisely follow the calculated line of curvature. Under the high speeds now attained by aircraft, practically every square inch of the surface of a plane must have the correct curvature so as to reduce air resistance substantially to a minimum. Where such parts of a plane are streamlined, the problem of shaping the surfaces of those parts, made as they are of relatively heavy stock, becomes increasingly difficult. These difficulties increase in the making of dies, forms, and other heavy pieces by means of which fairings, cowling covers, wing sections and other elements or finished parts are manufactured.

Because of the increasing demand for greater numbers of identical and precisely shaped parts, there has arisen a great need for a finishing tool which can be manipulated by a single operator without sacrificing in any way the precision of the result. To accomplish this the machine must be simple and rugged and at the same time so designed that all of the adjustments are accessible for manual manipulation by a single operator who can make all of the necessary preliminary and working adjustments without the need of a specially trained setup man.

In an embodiment chosen to illustrate my invention, there is provided a base 10 consisting of an I-beam 11 placed with the web 12 horizontally. At the sides of the I-beam are identical, vertical columns 13 and 14 likewise comprising I-beams which are secured to the sides of the horizontal I-beam by pairs of bolts 15 and 16 extending through the inner flanges of the columns and through the web 12 of the horizontally positioned beam. The tops of the columns are held together by a spanner plate 17 secured to the inside flanges of the I-beams by means of brackets 18 bolted to the respective parts. In practice it has been found that satisfactory tools have been made with columns extending to as high as 9 ft., although this is not proposed as setting a limit on the sizes to which the machine can be built.

On top of the base at about table height, there is provided a work plate or platform 20 which consists of a relatively thick, flat, metal slab having approximately the same width as the flange of the horizontal I-beam. The platform is mounted upon the upper flange of the I-beam by means of leveling screws 21 preferably located at the corners and so designed that they firmly position the plate in a precise horizontal plane spaced a slight distance from the upper surface of the horizontal flange. The leveling screws 21 are externally threaded and disposed in threaded openings 75 provided adjacent each corner of the platform (see Fig. 5). The leveling screws 21 terminate at their lower ends with reduced portions 71. These reduced portions 71 form shoulder 72. Complementary openings or bores 70 are provided in the flange 11 of the I-beam 10 for receiving the reduced portion 71 of the screws 21, the shoulder 72 resting upon the adjacent upper surface of the platform so that as the screws are adjusted the platform will be raised or lowered as desired. The plate provides a support for a work piece 22 which, as here illustrated, could be a form suitable for the making of engine cowlings or some similarly curved surface required to have a compound curved outer edge 23. The work piece in the embodiment herein shown is mounted vertically and clamped in position by some conventional means not shown, as for example, by being bolted to the plate or being held with suitable clamps attached to the surface of the plate.

For carrying the operating parts of the device, there is provided a pivotal mounting 25 which is located in a vertical position between the columns and has a pivot pin 26 extending upwardly through the plate 20 so that a point 27 thereon provides a lower bearing. Another pivot pin 28 extends downwardly through the spanner plate 17 so that a pivot point 29 extends into the upper end of the mounting and provides a bearing therefor. The pivotal mounting is thus supported between two opposed pivot points and is adapted to rotate freely about a vertical axis.

Secured to the mounting is a carriage 30 comprising a block 31 surrounding the mounting and rotatable relative thereto. At the lower end of the block there is a laterally extending element 32 upon which is a shelf 33 provided with brackets 34 designed to have attached thereto a template 35 having a convexly curved edge 36. The template is adapted to be secured to the bracket by such means as bolts 37.

For supporting a forming tool such as a grinder, there is provided a second block 38 of relatively large dimension which has a lateral extension 39 thereon located immediately above the block 31 and similarly surrounding the mounting with a free sliding and rotating fit relative thereto. In this embodiment an arm 40 has one end 41 extending through a cylindrical bore 42 in the block 38 so as to be supported thereby in a horizontal position. The arm has a free sliding fit in the bore so that it can be moved transversely as may be desired and a longitudinal configuration 40' adapted to engage aligning filler pieces, for preventing rotation of the arm in the bore 42.

At the end of the arm remote from the block there is provided a plate 43 fastened to the arm by means of a bolt 44 which has depending therefrom an extension 45. At the lower end of the extension is a shelf 46 upon which may be a grinding wheel 47 or other type of form, mounted in this case so as to rotate about a horizontal axis. Also mounted upon the shelf is a motor 48 connected to the grinding wheel by means of a belt 49 whereby the wheel is adapted to be driven by the motor, usually in a direction such that the point of contact with the work travels in a direction contrary to the direction of movement of the grinding wheel as a unit.

In order to properly guide the position of the grinding wheel there is provided a template follower comprising a downwardly extending bracket 50 located between the free end of the arm and the block 38. To the lower end of the bracket 50 is secured a support 51 bolted by means of a machine screw 52 to the bracket and upon the support is a cam follower 53 here shown having a substantially semicircular circumference and adapted to ride along the curved edge 36 of the template. A shim 54 may be provided between the support and the bracket so as to vary the relative position of the template follower.

The arm 40 is designed to be moved in a vertical direction in this embodiment so that it may be elevated from the initial position shown in Fig. 1 to a position wherein the cam follower is at the apex or top of the template. For shifting the arm up and down, there is provided a vertical screw 55 journaled at the top in a laterally extending plate 56 which is secured to the mounting. At its lower end the screw is journaled in the laterally extending element 32. The screw therefore has a fixed position of rotation determined by these two bearing areas.

In the lateral extension 39 there is a threaded bore 57 in alignment with and adapted to receive the threaded screw 55. At its lower end the screw has a bevel gear 59 which is adapted to mesh with a corresponding bevel gear 60. The bevel gear 60 is at the inside end of a crank shaft 61 which extends through and is journaled upon a side element 62. At the outer end of the crank shaft is a crank arm 63 and crank handle 64 by the rotation of which the screw 55 may be rotated through the bevel gear connection.

In operation the work piece 23 which has already been shaped roughly to the desired contour is mounted upon the plate 20 in vertical position so that the surface which is to be formed or ground to a precise, multicurved contour faces the front or righthand side of the machine, as viewed in Figs. 1 and 3. The work piece will be placed in such a position that a plane through the center passes through and is in alignment with the axis of the pivotal mounting 25. It may be presumed that the template 35 has previously been positioned in its proper place as shown in Figs. 1 and 3.

In initial position the grinding wheel 47 and template follower 53 will have positions vertically as shown in Fig. 1 and respective positions horizontally as shown in Fig. 3. The template follower 53 may have lateral flanges 65 so that they may encompass the edge of the curved template and cause the template and its carriage to rotate in a horizontal plane together with the arm 40. Any means for causing the template to swing with arm 40 in a fixed plane while permitting arm 40 to be raised and lowered to swing in various planes, may be used.

With the template follower 53 at the bottom of the template, the grinding wheel 47 may be swung back and forth through a horizontal arc so as to make an arcuate cut on the surface of the work piece having a radius of curvature equal to the distance between the axis of the vertical mounting and the contacting edge of the grinding wheel.

After the initial cut has been thus made, the arm 40 may be elevated a slight amount so that a second cut may be made. To do this it is necessary only to rotate the crank handle 64 which in turn rotates the screw 55 which by reason of its threaded engagement with the lateral extension 39 lifts the head 38 a slight amount and consequently lifts both the template follower and the grinding wheel 47 to a second position. As soon as the edge 36 of the template begins to curve inwardly from its lowermost corner, the corresponding edge of the work piece must be ground in a correspondingly inwardly curved direction if the work piece is to be patterned like the template. In order for the grinding wheel to move inwardly, the operator need only push upon the arm 40 in a direction from right to left as viewed in Fig. 1, thereby causing the cam follower to continue in contact with the curved edge 36 as the arm, together with the follower and grinding wheel, moves upwardly. This in practice is a relatively slow, step by step process, so that the arm is swung through a horizontal arc to and fro and continues its steady cutting while the arm carrying the grinding wheel is slowly elevated by rotation of the crank wheel 64. The template follower will continue following the edge 36 of the template all the way to the top and the grinding wheel will follow a similar path, since the distance between the two is fixed in advance.

Should the curve of the template be partially in reverse or featuring a concave configuration, the grinding wheel will continue to follow the curve of the template and cut a corresponding concave configuration in the outer edge of the work piece. This is useful in the shaping of many types of work pieces other than those that would be specifically streamlined for aircraft need.

Should the grinding wheel wear down to any appreciable extent, it is possible to maintain a precise distance between the cutting surface of the wheel and the edge of the template follower in contact with the template by such means, for example, as by removing the shim 54. A number of relatively thin shims may be inserted initially which can be removed one by one as the surface of the grinding wheel wears down so that the true distance between the edge of the template and the surface of the grinding wheel remains substantially the same, rather than making it necessary to continuously replace the grinding wheel with wheels of precisely the initial diameter. The semicircular follower is preferably of substantially the same radius as the radius of grinding wheel 47 and followers of decreasing radius may be substituted when the grinding wheel wears down. Other means obvious to those skilled in the art may be resorted to to compensate for wear in an apparatus of the sort herein described. As the follower reaches a rapidly curving portion of the template, as for example, the upper section of the template shown in the drawing, its semicircular form makes certain that the grinding wheel duplicates the curve on the work piece.

From the description given it will be observed that the arm 40 swings in various horizontal planes, since it may be regulatably and selectively raised by operation of the crank 64. The template holder and template swing with the arm while the work piece 22 is stationary. The template 35 is preferably held in such position that its axis of symmetry is parallel to the axis of the vertical pivot 25. Preferably the entire contoured edge 36 of the template lies in a plane passing through the axis of the vertical pivot 25. The work piece is shaped to the contour of the template in vertical section. A desired curvature along horizontal sections of the work piece is imparted to the work piece by positioning the work piece 22 at a proper distance from the axis of the vertical pivot 25. In the example illustrated, it will be evident that the work piece will be provided with an upwardly tapering convex surface of greatest horizontal radius at the bottom and of smallest horizontal radius at the top.

In order to make certain that the grinding wheel and follower maintain uniform contact with the work piece and template respectively, a counter weight may be provided, the counter weight being adapted to yieldably urge the arm 40 toward the template and the work piece.

Although the present machine tool has been illustrated as equipped with a grinding wheel, rotating in a direction contrary to its movement vertically as a unit, it will be appreciated that other forming and cutting tools may be utilized in a device of this sort which can be useful in shaping as well as finishing the surface of a work piece.

There has thus been described a machine tool which is capable of accommodating large work pieces such as the exterior portions of an airplane and which is adapted to produce upon them compound curves or warped surfaces which follow precisely predetermined calculations by the combined use of a template of predetermined curvature and a machine setting adapted to determine the curvature in a direction not determined by the template, the operating parts being so designed and positioned that they admit of ready and convenient manipulation by a single operator.

I claim:

1. A compound contour forming tool comprising: a work base adapted to fixedly support a work piece; a vertical pivot post in operative relation to the work base; a holder for a template, said holder being adapted to swing about the axis of the vertical pivot in a fixed horizontal plane, and to hold the template with a contoured edge thereof lying in a plane passing along the axis of the pivot; a horizontally extensible arm extending from the vertical pivot post and adapted to swing in various horizontal planes; a follower carried by the arm and in sliding contact with a contoured edge of the template; and a tool carried by the arm in fixed relation to the follower, said tool being adapted to engage a work piece and shape it to the contour of the template in vertical section and to a desired radius in horizontal section.

2. In a machine of the character stated in claim 1, the provision of means for adjustably raising said arm, and follower and tool carried thereby.

3. A contour former comprising a base adapted to support a roughly contoured work piece in an erect position, a pivot mounting adapted to rotate about an axis extending longitudinally relative to the work piece, a laterally extending carriage on the mounting and a curved template on the carriage extending substantially parallel to the work piece adapted to rotate with the carriage, and a contour cutting mechanism comprising a supporting block located on one side of the carriage and in sliding relation to the mounting, an adjusting screw attached to the carriage and the block and a crank for rotating the screw to shift the block longitudinally relative to the carriage, a cutter supporting arm mounted in the block and having a laterally extendable relationship therewith, said arm having a template follower extending into a position adjacent the curved edge of the template and a cutter having a position adapted to contact the surface of the work and power means adapted to drive the cutter while said cutter is simultaneously shifted longitudinally and swung about in an arcuate path to define a compound surface on the work.

4. A contour grinder comprising a base adapted to support a vertically mounted and roughly contoured work piece, a pair of vertical columns extending above the base at the sides thereof, a vertically supported pivotal mounting member extending between the columns adapted to rotate about a vertical axis, a laterally extending carriage member at the bottom of the mounting and a vertically mounted curved template on the carriage member adapted to rotate together with the carriage member and the mounting member and a contour grinding mechanism comprising a supporting block member surrounding said mounting member and in sliding relation thereto, an elevating screw journaled in one of the members and having a threaded engagement with the other member and a crank for rotating the screw to shift the block vertically, a grinder supporting arm mounted in the block and having a laterally extendable relationship therewith, said arm having a template follower extending into a position adjacent the curved edge of the template and a grinder having a position adapted to contact the surface of the work and power means adapted to drive the grinder while said grinder is simultaneously elevated and swung about horizontally to define a compound surface on the work.

5. A contour grinder comprising a base adapted to support a vertically mounted and roughly contoured work piece, a pair of vertical columns extending above the base at the sides thereof, a vertically supported pivot mounting extending between the tops and bottoms of the columns adapted to rotate about a vertical axis, a laterally extending carriage fixed to the bottom of the mounting and a vertically mounted curved sheet template on the carriage adapted to rotate together with the carriage and the mounting, and a contour grinding mechanism comprising a supporting block located above the carriage and surrounding said mounting in axially sliding relation thereto, an elevating screw journaled in the carriage and having a threaded engagement with the block and a crank for rotating the screw and adapted to thereby shift the block vertically, a grinder supporting arm mounted in the block and having a laterally sliding relationship therewith, said arm having an arcuately curved template follower extending into a position adjacent the curved edge of the template and a grinder comprising a grinding wheel having the same radius of curvature as the template follower having a position adapted to contact the surface of the work and power means adapted to drive the wheel while said wheel is simultaneously elevated and rotated to define a vertically curved and horizontally arcuate compound surface on the work.

6. A shaper for compound curved surfaces comprising a base adapted to support a work piece of substantial thickness so that an edge thereof to be worked is in an accessible position, a pivot support, a carriage slidably mounted at one end on the pivot support, a template adjacent the carriage having a curve on one edge thereof, a cutter extending laterally from the carriage into engagement with the edge of the work piece to be cut, said cutter having a path of rotation through an arc of radius determined by the distance between the cutter and the axis of the pivot support for making a curved cut on the work piece, said carriage having a plurality of successive positions spaced axially along the pivot support whereby the cutter is adapted to cut the work in an irregular curve determined by the curve of the template in a direction transverse to the path of rotation.

7. A shaper for compound curved surfaces comprising a base adapted to support a work piece of substantial thickness roughly contoured on the edge thereof, a pivot support having the axis thereof in a plane midway between opposite faces of said work piece and on the side remote from the roughly contoured edge, a carriage slidably mounted at one end on the pivot support and having the other end extending to a position adjacent the roughly contoured edge of the work piece, a curved template between the pivot support and the work piece defining a curve on one edge thereof, a cutter extending laterally from the end of the carriage adjacent the work piece, said cutter having a path of movement through an arc of radius determined by the distance between the cutter and the axis of the pivot support for making a curved cut on the work piece and means for progressively shifting the carriage axially along the pivot support whereby the cutter simultaneously follows an irregular curve determined by the curve of the template and in a direction transverse to the curved cut.

8. A shaper for compound curved surfaces comprising a base adapted to support in vertical position a work piece of substantial thickness and roughly contoured on the edge thereof, a pivot support having the axis thereof in a plane midway between opposite faces of said work piece and opposite an edge thereof remote from the roughly contoured edge, an elongated carriage mounted on to the pivot support in position offset from and substantially parallel to said plane, a curved template positioned between the pivot support and the work piece defining a vertical curve on one edge thereof, a cutter extending laterally from the carriage into said plane, said cutter having a path of rotation through an arc of radius determined by the distance between the cutter and the axis of the pivot support for making a horizontally curved cut on the work piece and means for shifting the carriage axially along the pivot support whereby the cutter in successive movements follows an irregular vertical curve determined by the curve of the template and in a direction transverse to the horizontal curve.

9. A former for compound curved surfaces comprising a base, a work platform on top of the base having corner leveling screws adapted to support the platform in a position spaced from the base, vertical columns extending above the platform and at the sides of the base and a vertical mounting having an adjustable, pivotal support at one end upon the platform and at the other end upon the columns, and a horizontally rotating combined grinder device and template follower comprising upper and lower portions engaging the mounting, said lower portion providing a template support and said upper portion including an arm, a forming tool at the end of the arm remote from the support adapted to engage the work, a vertically curved template on said lower portion, a template following element on the arm engaging the template, an adjusting means adapted to vary the horizontal distance between said element and the forming tool and an adjusting means between said upper and lower portions comprising a threaded screw journaled in one of said portions and threadedly engaging the other portion and a laterally extending crank connected with the screw adapted to rotate the screw and move one of said portions with relation to the other.

10. A former for compound curved surfaces comprising a base, a work platform on top of the base having corner leveling screws adapted to support the platform in a position spaced from the base, a vertical mounting having a pivotal support relative to the platform, and a horizontally rotating combined grinder device and template follower comprising upper and lower portions engaging the mounting, one of said portions providing a template support and the other of said portions including an arm, a forming tool at the end of the arm adapted to engage the work, a template on the lower portion curved in a direction transverse to the platform, a template following element on the arm engaging the template, and an adjusting means between said upper and lower portions comprising a threaded screw journaled in one of said portions and threadedly engaging the other portion and a laterally extending crank connected with the screw adapted to rotate the screw and move one of said portions with relation to the other.

11. In a machine tool for producing a compound curved surface on a work piece, the combination of a base having a work supporting surface, a mount for the work piece adjacent one side of the surface, said work piece having an operating position presenting said one side of the work piece to the front, an arm having one end mounted at a location remote from the work piece for rotation in a plane parallel to the plane of the supporting surface and a forming tool at the unmounted end of the arm having a path of movement over the work surface, a template support, a template thereon curved in a direction transverse to the plane of rotation of said arm and a template follower on the arm adapted to traverse the template, and means for shifting the arm in a direction transverse to the plane of rotation thereof comprising a rotating adjustment including a crank extending laterally relative to the rear of the work piece to a position wherein an operator has manual access simultaneously to the crank and the free end of the arm throughout the entire range of movement.

12. In a machine tool for producing a compound curved surface on one side of a work piece, the combination of a base having a horizontal work supporting plate, a mount for the work piece adjacent the front, said work piece in operating position presenting said one side toward the front of the machine tool, an arm mounted at one end rearwardly of the work piece for rotation in a plane parallel to the plane of the supporting plate and a forming tool at the free end of the arm adapted to be positioned for movement over said one side of the work piece, a template support between the work piece and the arm mounting movable with said arm, a template thereon curved in a direction transverse to the plane of rotation of said arm and a template follower on the arm adapted to traverse the template, and means for shifting the arm in a direction transverse to the plane of rotation thereof and radially inwardly comprising a screw on the arm and a crank for the screw extending laterally relative to the rear of the work piece to a position wherein an operator has manual access simultaneously to the crank and the free end of the arm throughout the entire range of movement.

13. A contour former comprising a base, a work piece mounted thereon, a laterally extending arm pivotally mounted on the base for movement in a plane parallel to the base, a template pivotally mounted on the base adapted to move in a plane parallel thereto and curved in a direction transverse to the plane of movement, a template follower on the arm constantly in contact with the curve and a tool on the arm adapted to engage the work and shape said work in conformance with both the curve of the template and the movement of the arm in a direction transverse to the curve of the template.

14. A contour former comprising a base, a roughly contoured work piece mounted thereon, a pivotal mounting on the base adapted to rotate in a predetermined plane, a laterally extending carriage on the mounting and a curved template on the carriage adapted to rotate with the carriage and a contour cutting mechanism comprising a supporting block located at one side of the carriage on said mounting, a block-shifting screw attached to the carriage and the block and means for rotating the screw to progressively change the position of the block, a cutter supporting arm mounted in the block and extending laterally therefrom, said arm having a template follower extending into a position adjacent the curved edge of the template and a cutter having a position adapted to be simultaneously elevated and rotated to cut a compound surface on the work.

ALBIN K. PETERSON.

REFERENCES CITED

The following references are of record in the file of this patent:

UNITED STATES PATENTS

| Number | Name | Date |
| --- | --- | --- |
| 1,146,684 | Bauer | July 13, 1915 |
| 1,877,546 | Albee | Sept. 13, 1932 |
| 2,016,574 | Myers et al. | Oct. 8, 1935 |
| 2,144,459 | Lively | Jan. 17, 1939 |
| 2,290,051 | Hinkley et al. | July 14, 1942 |
| 1,759,196 | Jackson | May 20, 1930 |
| 833,787 | Johnston | Oct. 23, 1906 |
| 1,332,437 | Ely | Mar. 2, 1920 |